No. 853,005. PATENTED MAY 7, 1907.
J. DAWKINS.
NUT LOCK.
APPLICATION FILED MAY 28, 1906.
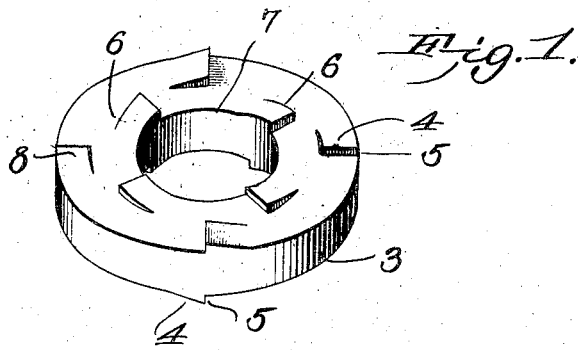
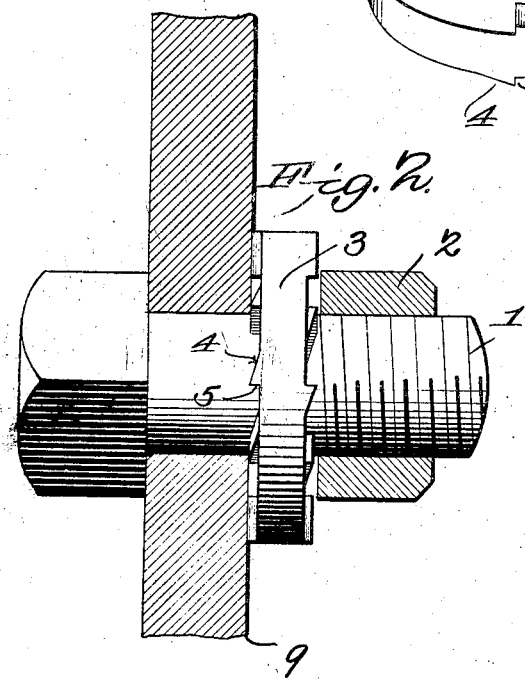
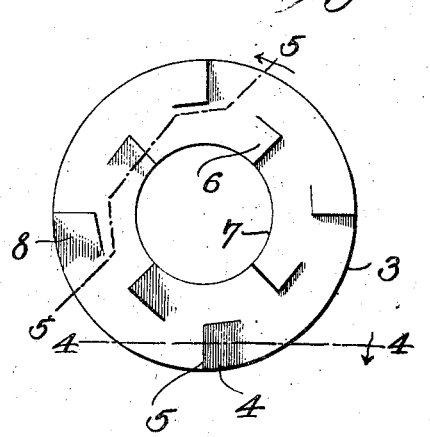
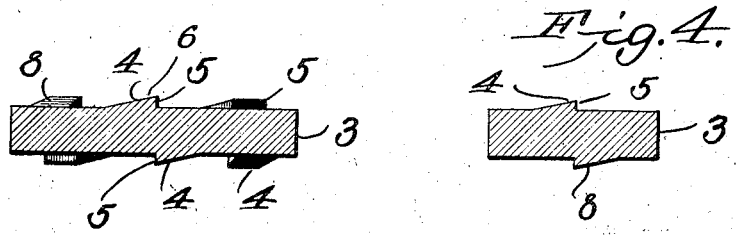
WITNESSES:
James Dawkins,
INVENTOR.
ATTORNEYS

UNITED STATES PATENT OFFICE.

JAMES DAWKINS, OF YAGER, CALIFORNIA.

NUT-LOCK.

No. 853,005.  Specification of Letters Patent.  Patented May 7, 1907.

Application filed May 28, 1906. Serial No. 319,190.

*To all whom it may concern:*

Be it known that I, JAMES DAWKINS, a citizen of the United States, residing at Yager, in the county of Humboldt and State of California, have invented a new and useful Nut-Lock, of which the following is a specification.

This invention has relation to nut locks and it consists in the novel construction and arrangement of its parts as hereinafter shown and described.

The object of the invention is to provide a nut lock consisting of a washer which is so constructed as to effectually bind or secure a nut upon a threaded bolt without necessitating the change in construction or alteration of either the nut or the bolt; that is to say, that the washer may be applied to nuts and bolts of ordinary construction and will perform the functions as above attributed.

The novel features of the invention reside in a peculiar configuration of the washer and the relative positions of its various surfaces or parts.

In the accompanying drawing, Figure 1 is a perspective view of the washer. Fig. 2 is a side elevation of the washer applied to a bolt showing the nut in section. Fig. 3 is a top plan view of the washer. Fig. 4 is a transverse sectional view of the washer cut on the line 4—4 of Fig. 3, and Fig. 5 is a transverse sectional view of the washer cut on the line 5—5 of Fig. 3.

As above indicated the bolt 1 and the nut 2 are of the usual pattern. The means for locking the nut 2 upon the bolt 1 consists of the washer 3, said washer is provided on its opposite faces with two separate and distinct sets of spurs, the spurs of each set being concentrically arranged upon the surface of the washer; one set being within the other and the spurs of the inner set being located radially opposite the intervals occurring between the spurs of the outer set and, vice versa. The said spurs are formed by precipitous surfaces 5, and inclined surfaces 4, and transversely through the washer the precipitous surfaces on opposite sides of the washer are alined; that is to say, that the plane in which said precipitous surfaces are located is at right angles to the transverse axis of the washer. All of the said spurs are of like construction and approximately of the same dimensions and a description of one will answer for all.

The spur consists of the inclined upper surface 4 which is provided with the precipitous surface 5. The said surface 5 extends at right angles to the surface of the washer 3, while the surface 4 extends at an obtuse angle. The breadth of the spur is substantially half of the breadth of the side of the washer 3.

The spurs are arranged upon the faces of the washer in two sets, both sets being concentrically located, one within the other. The inner set of spurs 6 have their inner edges in vertical alinement with the wall of the washer perforation 7 and their outer edges are located substantially at the central vertical axis of the washer side. The outer set of spurs 8 have their outer edges in vertical alinement with the circumferential edge of the washer 3 and their inner edges in vertical alinement with the central vertical axis of the washer side; that is to say, the outer sides of the spurs 6 are in circular alinement with the inner edges of the spurs 8. The spurs 6 are positioned upon the face of the washer in staggered relation to the spurs 8; that is to say, that in a transverse direction the spurs 6 are located opposite the intervals which occur between the spurs 8 and vice versa. The precipitous surfaces 5 of all of the said spurs extend radically across the faces of the washer 3.

In a transverse direction across the washer the precipitous sides 5 of the spurs on one side are in the same plane as the precipitous sides 5 on the opposite side of the washer, while the inclined sides 4 of the spurs on opposite sides of the washer are parallel; that is to say, that the spurs on the opposite sides of the washer are oppositely disposed but the same arrangement of spurs on both sides of the washer is maintained. The advantage of this construction is that each side of the washer is provided with 8 or more locking spurs, the locking edges of which are positioned transversely opposite each other in cross section through the washer, thus the washer is thickened at its locking or working edges and is materially strengthened. As each spur extends substantially but half way across the face of the washer and the spurs of one set are staggered with relation to the spurs of the other set, a very powerful locking arrangement is presented. The angle of inclination of the surfaces 4 with the surfaces 5 of the spurs is such that the locking edges of the said spurs may effectually enter or bite the faces of the nut 2 or the stationary support 9 receiving the bolt 1; in other words an effective nut lock of simple and cheap construction is produced.

Having thus described my invention what I claim is new and desire to secure by Letters Patent is:—

A nut lock comprising a washer having upon each of its opposite faces an inner and outer set of spurs, all of said sets being concentrically positioned, the inner spurs extending from the inner edge of the washer and terminating equidistant between the inner and outer edges thereof, the outer spurs extending from the outer edges of the washer and terminating equidistant between the outer and inner edges thereof, each spur having a precipitous side extending at right angles to the face of the washer and an inclined side extending at an acute angle to the face of the washer, the spurs of one set on one face occurring laterally opposite the intervals between the spurs of the sets occurring upon the same face, the vertical sides of the spurs on one face of the washer being located in the same transverse planes as the vertical sides of the spurs upon the opposite face of the washer.

In testimony that I claim the foregoing as my own, I have hereto affixed my signature in the presence of two witnesses:

JAMES DAWKINS.

Witnesses:
  A. D. PHARES,
  LIZZIE BARRY.